3,503,376
ENGINE IGNITION TIMER
Brooks Walker, 1280 Columbus Ave.,
San Francisco, Calif. 94133
Filed Aug. 14, 1967, Ser. No. 660,264
Int. Cl. F02p 5/10, 5/04; F02d 37/02
U.S. Cl. 123—117                                3 Claims

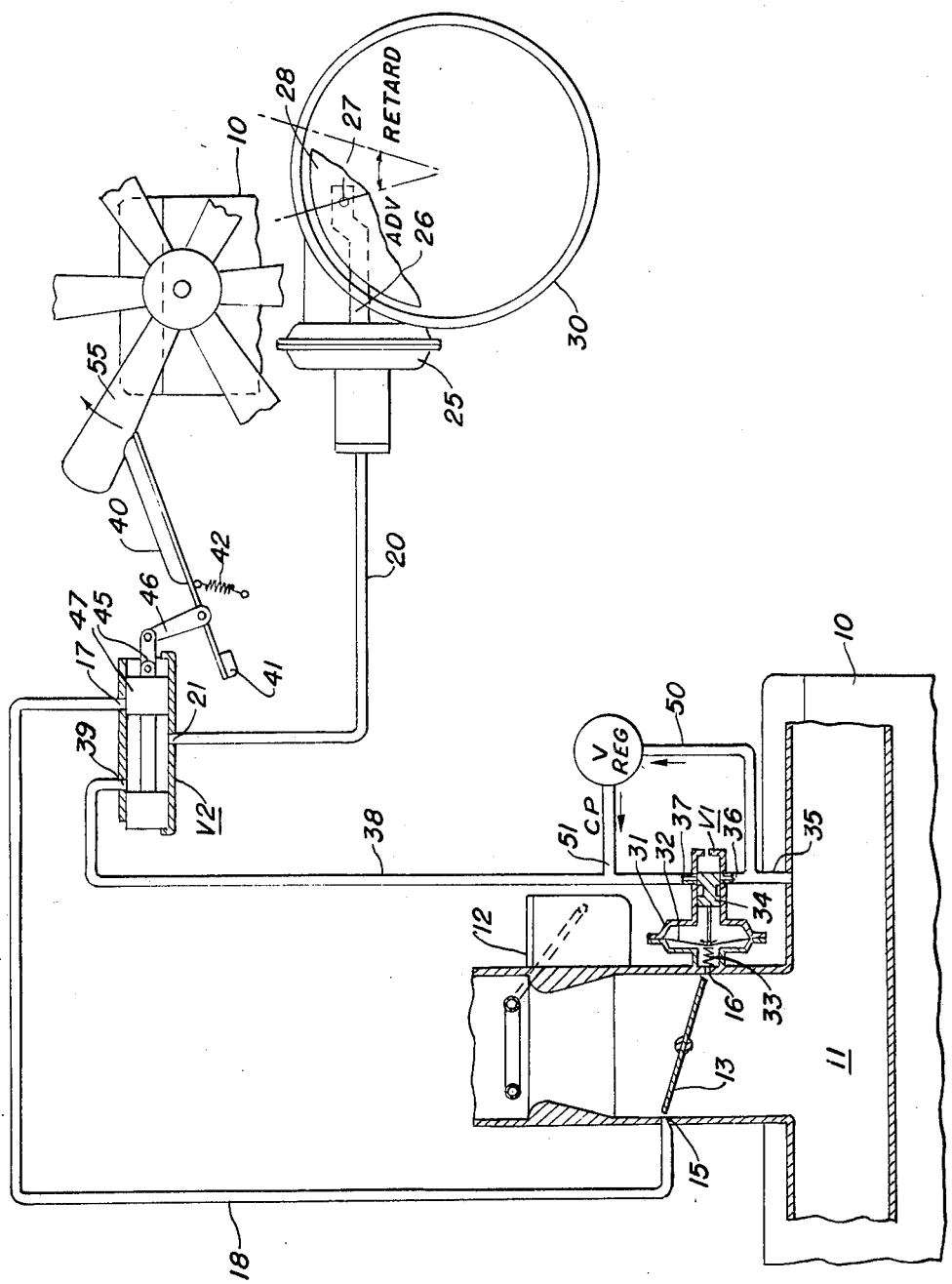

ABSTRACT OF THE DISCLOSURE

A device response to speed and throttle position to control the timing of the ignition in an internal combustion engine. The conventional suction operated motor is selectively connected by a pair of conduits and an engine speed sensing valve to the intake manifold or to the high port in the carburetor in accordance with the speed of the engine. The conduit from the manifold is provided with a by-pass section containing a suction regulating valve. A valve response to the engine idle position of the throttle connects reduced manifold suction through the suction regulator to the speed sensing valve. The high port connects the speed sensing valve to atmosphere when the throttle is in engine idle position.

---

An object of the invention is as stated in the abstract.

Another object is the use of a simple suction actuated motor such as a small diaphragm motor actuated valve to switch from intake suction going to the suction actuated spark advance motor to a path through a suction regulator when the throttle is closed or in idle position, which results in manifold suction from a "low port" on the downstream side of the edge of the throttle butterfly to operate said small diaphragm motor actuated valve. By this construction intake suction going to the suction operated spark advance mechanism will be limited on closed throttle decelerations for limited suction operated spark advance compared to full suction actuated spark advance for lower exhaust emissions on some engines than if full suction operated advance were used.

Another object is the use of a speed sensor such as a cup close to the rear of an engine operated cooling fan to switch from a high port or spark advance port to intake suction to operate a suction operated spark advance mechanism as described in U.S. patent application Ser. No. 647,798, dated June 21, 1967, entitled "Air Cup Speed Sensor," in combination with the control as described to give a limited suction operated spark advance above a selected engine speed on closed throttle decelerations, normal suction operated spark advance at all cruises and full throttle operation and no suction operated spark advance at idle.

Other means not shown could be used to get a further spark retard at idle such as a governor retard on the cam that provides governor advance to the spark in addition to such advance as is provided by the suction actuated spark advance.

A suction opreated spark retard at idle could be provided by a speed sensor operated multiple valve to give suction operated retard and no suction operated advance at idle, as shown in my U.S. patent application, Ser. No. 593,363, dated Nov. 10, 1966, entitled "Spark Timing Control," if desired, within the scope of this invention.

Other features will be more particularly pointed out in the accompanying specification and claims.

I have illustrated my invention by way of example in the accompanying drawing, which shows one form of the invention, mostly diagrammatically but partly in section or outline of the components.

In the drawing I have shown an engine 10 (mostly cut away) with an intake manifold 11 to which is attached a carburetor 12 with a throttle valve 13. A high port or spark advance port 15 is located just above the high or upstream edge of the throttle valve 13 when in the engine idle position. A low port 16 is located on the engine side of the lower edge of the throttle butterfly valve 13 so as to be exposed to the suction in intake manifold 11 only when the throttle 13 is in the engine idle or power off deceleration position. At other times it is on the upstream side of said butterfly throttle 13.

High port 15 is connected to valve V2 at port 17 by line 18. Line 20 connects port 21 of valve V2 to suction operated spark advance mechanism 25. Mechanism 25 has arm 26 attached to breaker plate 28 by pin 27 in distributor 30 in a conventional manner. A governor may be located in the distributor 30 on the drive side of the breaker cam in a conventional manner, not shown. Port 16 is connected to suction operated motor 31 which has a diaphragm 32 and a spring 33 urging diaphragm 32 to the right, as viewed in the drawing, so that valve plunger 34 in valve V1 is normally open so that suction from manifold 11 can flow through pipes 35, 36, 37, 38 to port 39 when throttle 13 is in engine cruise position but when in engine idle or closed throttle deceleration position, as shown, diaphragm 32 will be sucked to the left, as viewed, and close valve V1 by plunger 34 moving to the left closing the passage from line 36 to 37 and forcing the suction to go from intake manifold 11 through lines 35, 50, regulator R, line 51, line 38, past valve V2 to line 20 to spark advance mechanism or motor 25 for limited spark advance on closed throttle deceleration.

Above a predetermined engine speed, cup 40 which can be balanced by weight 41, is moved counter clockwise against spring 42 to move plunger 47 to the position shown by link 45 and arm 46. In this position plunger 47, tube 38 and port 39 will be connected to line 20 and suction operated spark advance motor 25 so that for all cruises the suction on motor 25 will be full intake manifold 11 suction but on closed throttle decelerations when diaphragm 33 will move plunger 34 to the left to close valve V1 (as shown), then suction from line 35 will have to flow through line 50, regulator R and line 51 to line 38 past valve V2 (as engine 10 is above a selected engine speed as determined by the adjustment of spring 42) to line 20 and to suction operated motor 25 to provide limited motion to the suction operated spark advance motor 25 for lower exhaust emissions with some engines on closed throttle deceleration above a selected engine speed than if such a control were not used. At lower speeds cup 40 will be lowered by spring 42 as the air following engine cooling fan 55 will not be enough to counteract the action of spring 42 and then plunger 47 will move to the right (as viewed) to close off port 39 and connect high port 15, line 18 to line 20 so that at low engine speeds suction at high port 15 will control spark advance motor 25 to give no spark advance at idle and quick return to manifold suction operated spark advance by motor 25 when butterfly throttle valve 13 passes high port 15 as at light and heavy cruises such as low and high speed level cruises or hill climbing, etc.

I have illustrated my inventions in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

What is claimed is:

1. A spark timing device for an internal combustion engine having an intake manifold, a carburetor and a throttle valve in the carburetor comprising a suction operated spark control motor, means operative with the engine running above a preselected speed for supplying manifold suction to the motor with the throttle shifted away from engine idle position and for supplying less than manifold suction with the throttle in engine idle position, and means for supplying manifold suction to the motor when the engine is running at less than said preselected speed and with the throttle removed from engine idle position.

2. A spark timing device as defined in claim 1 wherein the first mentioned means comprises a valve responsive to the speed of the engine, a first conduit connecting the valve to the motor and a second conduit connecting the valve to the manifold, said second conduit comprising a by-pass section, a pressure regulator in said section, and selector valve means responsive to the position of the throttle for selectively connecting the manifold directly to the speed responsive valve or through the regulator to said speed responsive valve.

3. A spark timing device as defined in claim 1 wherein the second mentioned means comprises a valve responsive to the speed of the engine, a first conduit connecting the valve to the motor, an opening through the carburetor wall and a second conduit connecting the valve to said opening, said opening being positioned between the throttle and manifold when the throttle is shifted from engine idle position.

References Cited

UNITED STATES PATENTS

| | | | |
|---|---|---|---|
| 2,455,594 | 12/1948 | Mallory | 123—117.1 |
| 2,470,366 | 5/1949 | Ostling | 123—117.1 |
| 2,545,709 | 3/1951 | Smitley | 123—117.1 |
| 2,650,581 | 9/1953 | Short et al. | 123—117.1 |
| 2,732,833 | 1/1956 | Hook | 123—117.1 |
| 2,867,197 | 1/1959 | McCollough | 123—117.1 |
| 3,272,191 | 9/1966 | Walker | 123—117.1 |
| 3,329,136 | 7/1967 | Cadiou | 123—117.1 |

WENDELL E. BURNS, Primary Examiner

U.S. Cl. X.R.

123—97